Oct. 13, 1942.                B. BURWELL                2,298,464
           VANADIC OXIDE FLAKES AND METHODS FOR MAKING THE SAME
                    Filed April 11, 1940        2 Sheets-Sheet 1

INVENTOR
BLAIR BURWELL
BY
ATTORNEY

Oct. 13, 1942.  B. BURWELL  2,298,464
VANADIC OXIDE FLAKES AND METHODS FOR MAKING THE SAME
Filed April 11, 1940  2 Sheets-Sheet 2

INVENTOR
BLAIR BURWELL
BY
ATTORNEY

Patented Oct. 13, 1942

2,298,464

UNITED STATES PATENT OFFICE 2,298,464

VANADIC OXIDE FLAKES AND METHOD FOR MAKING THE SAME

Blair Burwell, Uravan, Colo., assignor to United States Vanadium Corporation, a corporation of Delaware Application April 11, 1940, Serial No. 329,094

2 Claims. (Cl. 23—140)

Methods for recovering vanadium from its ores usually yield, at some stage, vanadic oxide in a pure or nearly pure form. Such oxide is then usually converted to ferro-vanadium, although it can be used for other purposes. The vanadic oxide is customarily fused and cast into the form of blocks or pigs, which must then be pulverized before the material is further processed. Sometimes it is sintered, and the sintered masses are pulverized.

Pulverizing produces dust. Vanadic oxide dust is highly toxic. Therefore, the pulverizing, subsequent transportation, and further processing of vanadic oxide are hazardous operations requiring the constant use of precautions. Furthermore, the dust particles tend to interfere with the efficient use of pulverized vanadic oxide as for instance in aluminothermic reduction. Still further, it is difficult to prevent the loss of some of the dust during handling and processing. Not only are dust losses serious because of the health hazards, but vanadium oxide is such a valuable material that a loss of even a small percentage of a moderately large quantity of oxide may involve substantial monetary loss as well.

There is a demand for vanadic oxide in subdivided but substantially dust free form. Accordingly, among the important objects of this invention are the provision of a new and useful subdivided form of vanadic oxide as an article of manufacture, a new method useful for producing vanadic oxide in such novel form, and a novel apparatus suitable for use in practicing the said method. Another object is to provide a substantially dust free mass of vanadic oxide flakes, each flake consisting of acicular or fibriform crystalline grains disposed substantially perpendicularly to the surfaces of the flake so that the flake has a fibrous edge fracture, and at least one of the large surfaces of each flake being smooth so that the mass may be handled during transportation or use without the formation of toxic dust in substantial quantity.

According to the invention, the method of making vanadic oxide flakes comprises, as essential steps, casting molten vanadic oxide as a thin layer on a cold surface, and removing the solidified layer and breaking the layer into flake pieces. The cold surface is smooth, of metal, and cooled by water or other cooling liquid kept out of direct contact with the vanadic oxide. The procedure is to form a stream of molten vanadic oxide; to pour such stream onto a horizontal metal surface to form a thin layer; to move the surface, carrying said layer, away from the stream, and simultaneously to cool, and to solidify, the layer of vanadic oxide by passing a cooling liquid in indirect heat exchange relationship to the layer; and to remove from the metal surface the solidified layer of vanadic oxide and simultaneously to break the layer into flat flakes of the same thickness as said layer. The removal and breaking of the layer may both be done by a single scraping operation.

Flakes produced in the manner just described are flat and have relatively smooth surfaces that effectively resist abrasion by other flakes of the same kind. The surfaces which are formed next a smooth metal chill are shiny, with a vitreous or submetallic luster. Examination of the fractured edges of the flakes shows that the as-cast structure consists of fibriform or acicular crystalline grains oriented approximately perpendicularly to the larger faces of the flakes. Thus, when a flake is broken the tendency is to form pieces having one dimension at least as great as the original thickness of the flake, rather than to form fine powder.

The size and thickness of the flake may be readily controlled within wide limits by controlling the rate of pouring the fused oxide, and the rate of travel of the chilling surface. Flakes from about one thirty-second of an inch to about three eighths of an inch thick are of general suitability.

A machine for carrying out the method just described may suitably comprise essentially a water-cooled annular ring of metal, supported by wheels on a circular track and driven in a horizontal plane. A stream of molten vanadic oxide may be poured onto the rotating ring at one point of its path, cooling water may be passed in contact with the under side of the ring, and solidified oxide may be removed by a plough or other scraping device located a suitable distance along the path in the direction of rotation of the ring. Preferably, the annular ring consists of several hollow segments, in each of which cooling water flows in a direction counter to that of rotation of the ring.

A typical embodiment of the invention is illustrated in the accompanying drawings in which:

Fig. 4 is a top sectional view of a single segment, showing the cooling water connections; and Fig. 5 is a representation of a typical flake of vanadic oxide according to the invention, showing in formalized fashion several of the distinctive features thereof.

Figure 1:
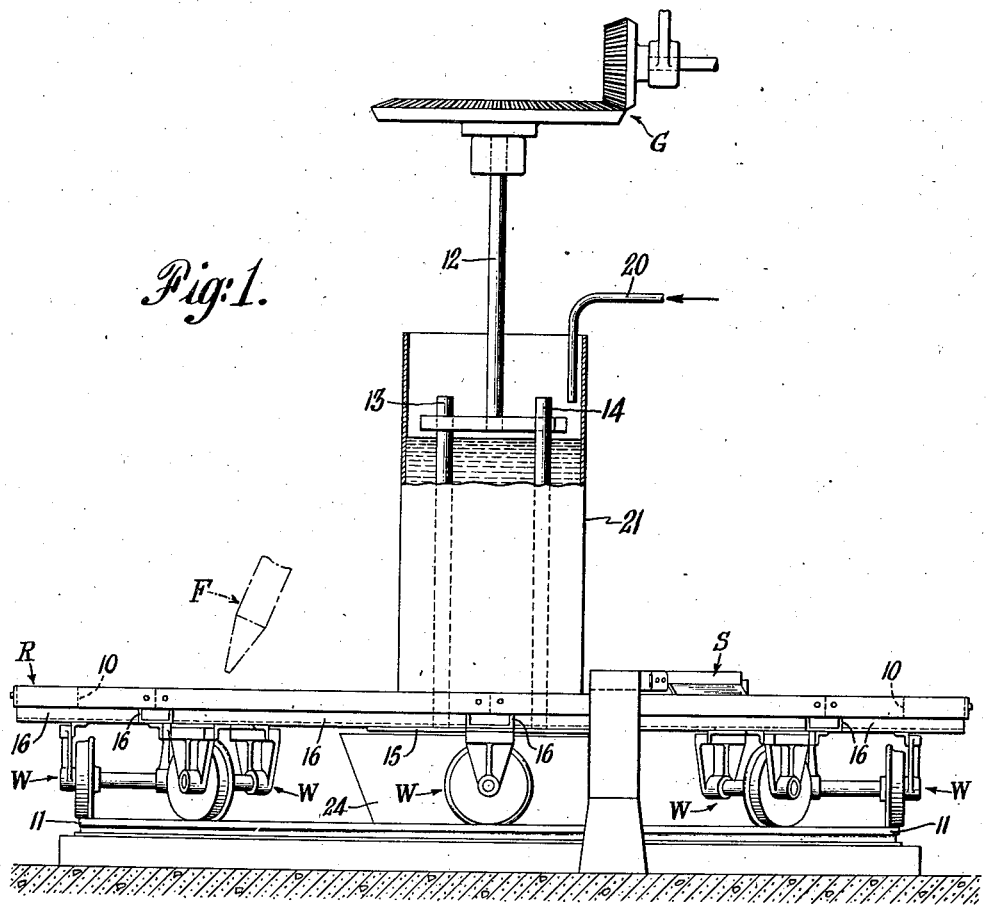
Fig. 1 is an elevation, partly in section, of a machine suitable for use in practicing the method described.

The principal feature of the invention is the rotatable annular ring R, which is made up of a number of similar hollow segments 10 bolted end-to-end and supported on a circular rail 11 by a suitable number of wheeled trucks W. The annular ring R is rotated by a suitable source of motive power (not shown) through conventional gearing G and a driving mechanism D which comprises a shaft 12; driving pins 13 and 14; and a spider consisting of a center ring 15 connected to the pins 13 and 14, arms 16 attached to the annular ring R at the joints between adjacent segments 10, and a stiffening ring 17.

Figure 2:
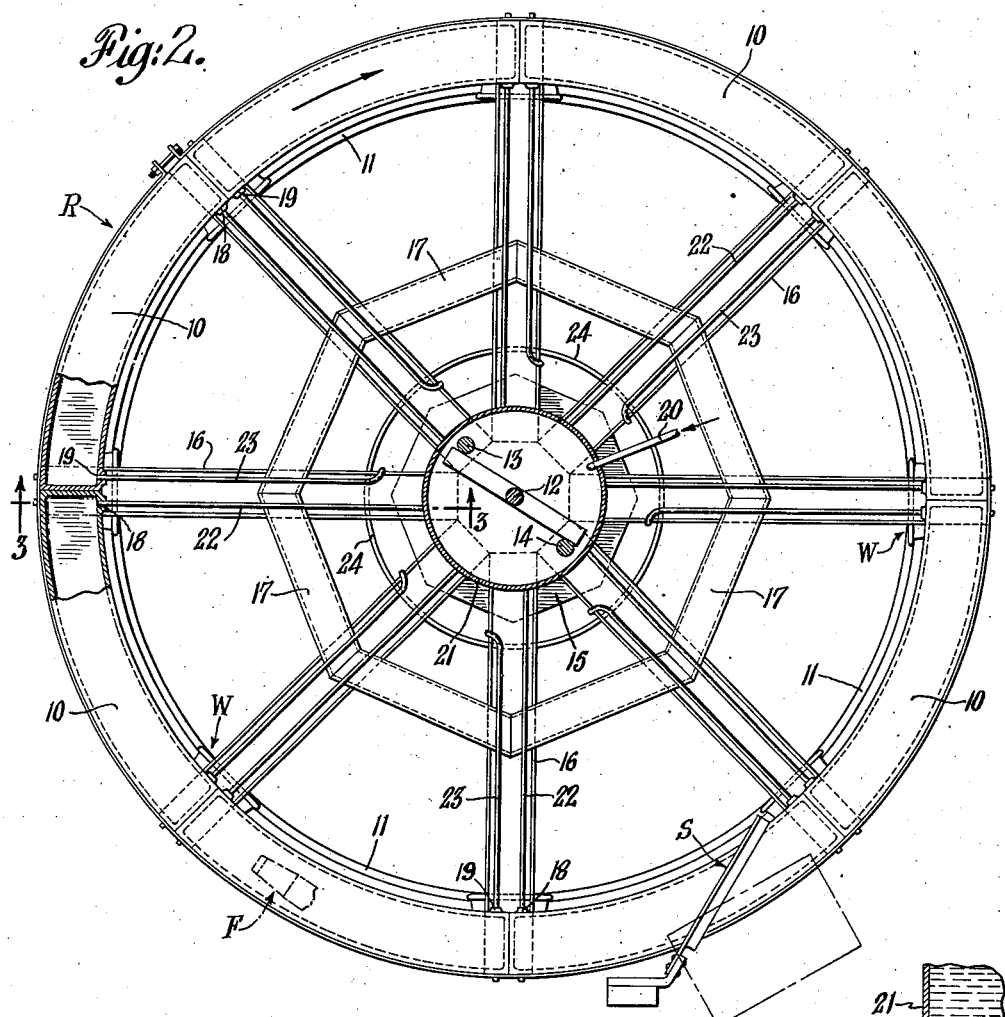
Fig. 2 is a plan view of the machine of Fig. 1, certain parts being broken away to reveal structural details.
Figure 3:
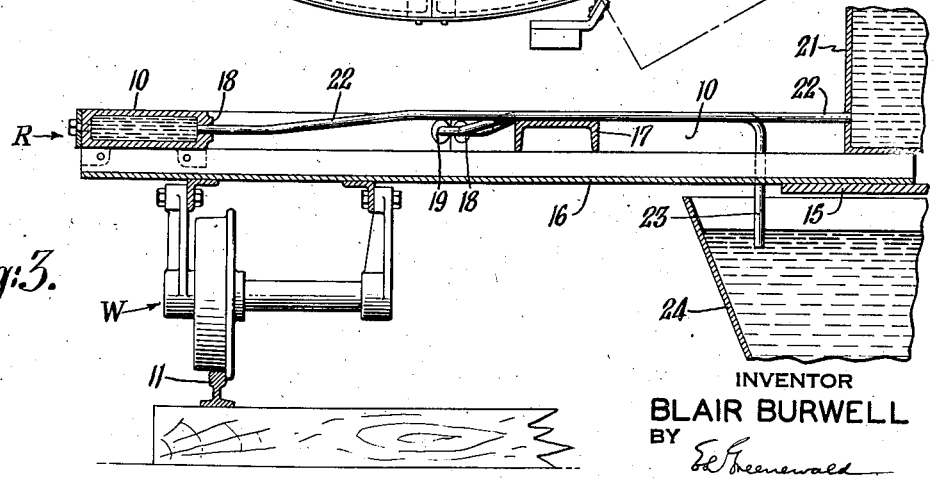
Fig. 3 is a partial section, taken through the line 3—3 of Fig. 2, of a part of the machine.

As shown in Figs. 2 to 4, each segment 10 is hollow and provided with an inlet connection 18 and an outlet connection 19 for cooling water.

Cooling water may be supplied through a pipe 20 opening into a head-regulating tank 21 which serves as a feeder for cooling water distributing pipes 22 each of which is connected to the inlet connection 18 of a segment 10. Cooling water circulates through each segment 10 in a direction counter to that of rotation of the annular ring R, and issues from the outlet connection 19 through a pipe 23 into a warm water collecting tank or well 24.

In operation, the annular ring R is set into rotation, cooling water is passed through the segments 10, molten vanadic oxide is poured in a stream to form a thin layer on the upper surface of the ring R through an appropriate feeding means F. As the cast layer of vanadic oxide travels away from the feeding means F it is cooled and solidified by the cooled metal top of the ring R. A scraper S removes the solid layer of oxide and breaks it into flake pieces.

A conventionalized representation of a vanadic oxide flake is shown in Fig. 5. Such a flake has a fibriform edge 25, and a surface 26 which is substantially as smooth as the top surfaces of the segments 10 although indentations 27 and folds are apt to form.

Vanadic oxide flakes may be mixed with subdivided aluminum, in proportions approximately those required by stoichiometric calculation for complete reduction of the oxide, to form a furnace charge which will react more smoothly, and with a materially higher recovery of vanadium, than pulverized oxide mixtures in aluminothermic reduction processes. For example, in operations producing ferrovanadium under conditions similar in every respect except the use of pulverized or flake vanadium oxide in the oxide-aluminum furnace charge, recovery records over a period of a week or more show that about 1% more vanadium was recovered when using flake vanadic oxide than when using pulverized fused vanadic oxide.

I claim:

1. As an article of manufacture, a substantially dust free flake composed of fibriform crystalline grains of vanadic oxide oriented substantially perpendicular to the larger faces of the flake, said flake having at least one smooth flat surface which permits the flake to be transported and used with others of its kind without formation of toxic dust in substantial quantity.

2. Method of preparing substantially dust-free flakes of vanadic oxide, said flakes having substantially smooth surfaces and acicular, fractured edges, which comprises pouring a stream of molten vanadic oxide onto a horizontal metal surface to form a thin layer of vanadic oxide; moving the surface carrying said layer away from said stream, and simultaneously solidifying the layer by passing a cooling liquid in indirect heat-exchange relation to said surface; and removing from the said surface the solidified layer of vanadic oxide, and simultaneously breaking it into flat flakes of the same thickness as said layer.

BLAIR BURWELL.